April 14, 1953     L. G. MORRISON     2,634,704

MASKING DEVICE FOR AUTOMOBILE TIRES

Filed Dec. 7, 1951

INVENTOR
LESTER G. MORRISON

BY McMorrow, Berman + Davidson
ATTORNEYS

Patented Apr. 14, 1953

2,634,704

UNITED STATES PATENT OFFICE 2,634,704

MASKING DEVICE FOR AUTOMOBILE TIRES

Lester G. Morrison, Chattanooga, Tenn.

Application December 7, 1951, Serial No. 260,370

4 Claims. (Cl. 118—505)

This invention relates to a mask adapted to be applied to an automobile wheel, in a manner operative to protect the tire constituting a portion of said wheel, while the wheel or adjacent portions of the automobile body are being sprayed with paint.

In spray painting operations, it is necessary to mask portions of the vehicle which are not to be painted, in view of the difficulty of confining the spray to the area to be coated.

Heretofore, the masking of the automobile tires has been a laborious and time-consuming duty, and has prolonged the over-all painting operation to an undesirable extent.

As a result, it has been proposed to mask the automobile wheels with flexible covers, and while these have proved satisfactory when an adjacent fender is being painted, they have not been usable when the wheel itself is to be painted, due to the fact that those wheel masks, of which I have knowledge, cover not only the tire, but the entire wheel.

Accordingly, it is the main object of the present invention to provide a wheel mask which can be applied to or removed from a wheel speedily and easily, and which will mask only the tire portion of the wheel, leaving the center or body portion fully exposed, so that it may be sprayed without difficulty.

Another important object is to provide a wheel mask of the type stated which can be removed from the wheel without damaging the newly applied coat of paint.

Yet another important object is to provide a mask for automobile wheels which will not damage the tire casing or central body portion of the wheel.

Still another object of importance is to provide a masking device for automobile wheels which can be manufactured at low cost, will be usable indefinitely, and will comprise a minimum of parts simply arranged in a manner whereby they will not readily get out of order.

Other objects will appear from the following description, the claims appended thereto, and from the annexed drawing, in which like reference characters designate like parts throughout the several views, and wherein:

Figure 1:
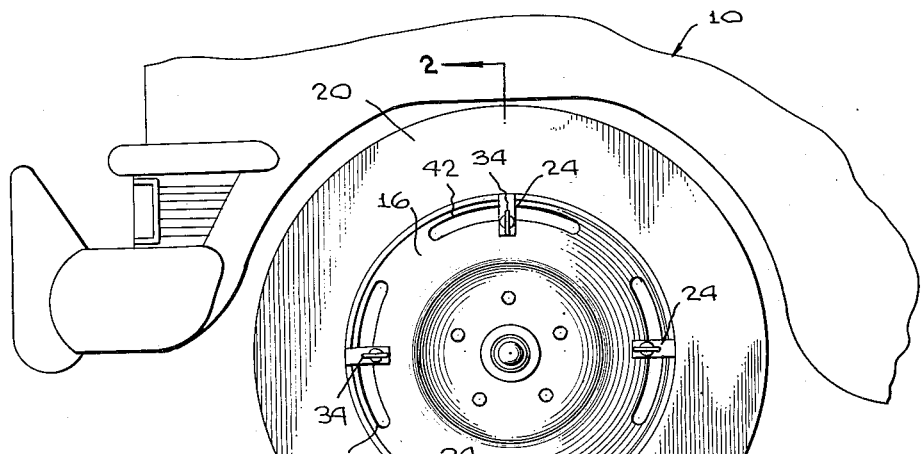
Figure 1 is a side elevational view of a masking device formed in accordance with the present invention, as it appears when applied to a conventional automobile wheel, an automobile body being illustrated fragmentarily.

Referring to the drawing in detail, the reference numeral 10 designates generally an automobile body of conventional design, and the numeral 12 has been used to generally designate an automobile wheel having a rim 14 mounted upon the periphery of a circular body 16, a tire 18 being mounted upon said rim.

The masking device constituting the present invention includes an annular, plane, tire-protecting flange 20, which may be readily formed from a single piece of flat metal material. The flange 20 is proportioned to overlie protectively the tire 18, and has an annular, inturned lip 22 that is integrally formed upon the inner edge of the flange.

Secured to the lip 22, at locations spaced circumferentially of said lip, are equidistant brackets 24 extending radially and inwardly of the flange. As may be readily noted from Figures 2 or 3, each bracket 24 is of substantially right-angular configuration, having a free end portion lying in the plane of the flange 20, and an inturned leg 26 secured to the inner surface of the lip 22 by bolts 28 or equivalent fastening elements.

Formed in the free end portion of each bracket is an opening 30, receiving a latch rod 32 which may be formed from a length of stout wire material folded upon itself and twisted spirally, said length of wire material being formed with a loop 34 disposed at one end of the latch rod, and with oppositely directed, outwardly extended, wheel-engaging fingers 36.

The loop 34 defines an enlargement at the outer end of each latch rod, that can be grasped to serve as a handle, and which is also adapted to define a stop shoulder engaging a washer 38. A spiral spring 40 surrounds the intermediate portion of the latch rod, and abuts at one end against the washer 38, said spring abutting at its other end against the associated bracket 24.

When the masking device is to be applied to an automobile wheel, the inner ends of the latch rods are extended through the conventional circumferentially spaced slots provided in the wheel body adjacent the rim 14, after which said latch rods are rotated through 90 degrees, thus to engage the fingers 36 under the opposite walls of the slots. As a result, the masking device is held securely against the wheel. However, the masking device will not injure the rim or tire casing, by reason of the fact that the inside edge of the lip 22 is provided with a protective gasket 24 of rubber or similar material, the gasket 24 being of annular formation and being formed to a U-shaped cross sectional configuration, so as to engage said inside edge of the lip with the desired tightness.

Figure 2:
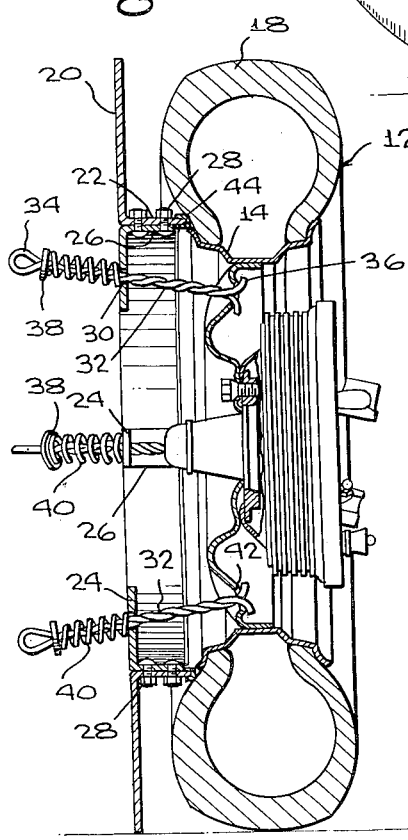
Figure 2 is an enlarged sectional view taken substantially on line 2—2 of Figure 1.
Figure 3:
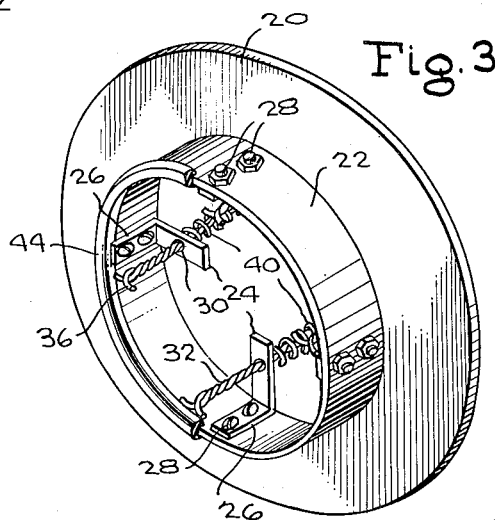
Figure 3 is a perspective view of the masking device as it appears when disassociated from the wheel, a portion being broken away to show details of construction, said device being viewed from the rear.

As may be noted from Figure 2, the gasket 24 engages the tire casing at the meeting point of said casing and of the rim 14, so that the gasket is in contact with the rim 14 throughout the periphery of the rim, but is disposed exteriorly of the rim, thus to permit the rim to be painted fully to its outside edge.

It will be readily appreciated that in spray painting operations, it is merely necessary to apply the masking device to the automobile wheel, after which the body 16 and rim 14 can be spray painted without fear of the paints being deposited upon contiguous portions of the tire casing. Additionally, the fender of the automobile body 10 can be spray painted, and again, the paint will not be accidentally sprayed upon the automobile tire.

The invention is particularly of importance in connection with tires, such as white-wall tires, but of course, is desirably used to protect any other types of automobile tires.

It will be understood that the masking device can be made in different sizes, to fit different sizes of automobile wheels. Alternatively, the device can be formed with a radially contractible portion, so as to be adjustable to fit any wheel sizes.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. For application to an automobile wheel having a body formed with circumferentially spaced slots, a rim, and a tire, a masking device comprising: an annular flange of rigid material adapted to be arranged substantially concentrically with an automobile wheel in laterally spaced relation thereto, said flange being proportioned to protectively overlie the tire of the wheel while leaving the body and rim exposed; an annular lip on the inner edge of the flange and extended transversely of the flange, said lip being adapted to engage the tire at the meeting point of the tire and one edge of the rim; and a plurality of latch rods mounted upon said flange for movement transversely thereof toward and away from the body, said latch rods being adapted at one end to releasably engage in the slots to support the flange against the wheel.

2. For application to an automobile wheel having a central body formed with circumferentially spaced slots, a rim, and a tire, a masking device comprising: an annular flange of rigid material adapted to be arranged substantially concentrically with an automobile wheel in laterally spaced relation thereto, said flange being proportioned to protectively overlie the tire of the wheel while leaving the body and rim exposed; an annular lip on the inner edge of the flange and extended transversely of the flange, said lip being adapted to engage the tire at the meeting point of the tire and rim; a plurality of brackets mounted on and spaced circumferentially of said lip and extending radially and inwardly of the flange; and a plurality of latch rods mounted upon the respective brackets for movement transversely of the flange toward and away from said body, the latch rods being adapted at one end to releasably engage in the slots to support the flange against the wheel.

3. For application to an automobile wheel having a central body formed with circumferentially spaced slots, a rim, and a tire, a masking device comprising: an annular flange of rigid material adapted to be arranged substantially concentrically with an automobile wheel in laterally spaced relation thereto, said flange being proportioned to protectively overlie the tire of the wheel while leaving the body and rim exposed; an annular lip on the inner edge of the flange and extended transversely of the flange, said lip being adapted to engage the tire at the meeting point of the tire and rim; a plurality of brackets mounted on and spaced circumferentially of said lip and extending radially and inwardly of the flange; a plurality of latch rods bearing upon the respective brackets for movements transversely of the flange toward and away from the body, said latch rods being adapted at one end to releasably engage in the slots to support the flange against the wheel; and springs interposed between the respective brackets and the other ends of the rods and arranged to exert a continuous, yielding pressure on the rods tending to urge the rods in a direction away from said body.

4. For application to an automobile wheel having a body formed with circumferentially spaced slots, a rim, and a tire, a masking device comprising: an annular flange of rigid material adapted to be arranged substantially concentrically with an automobile wheel in laterally spaced relation thereto, said flange being proportioned to protectively overlie the tire of the wheel while leaving the body and rim exposed; an annular lip on the inner edge of the flange extended transversely of the flange, said lip being adapted to engage the tire at the meeting point of the tire and rim; a plurality of brackets mounted on and spaced circumferentially of said lip and extending radially and inwardly of the flange; a plurality of latch rods slidably mounted upon the respective brackets for movement transversely of the flange toward and away from the body, said latch rods being rotatable in the brackets and having oppositely extended lateral fingers at one end releasably engageable under opposite edges of the slots responsive to partial rotation of the rods in the brackets, to support the flange against the wheel; and springs interposed between the respective brackets and the other ends of the rods and arranged to exert a continuous, yielding pressure on the rods tending to urge the rods in a direction away from said body.

LESTER G. MORRISON.

References Cited in the file of this patent

UNITED STATES PATENTS

| Number | Name | Date |
|---|---|---|
| 1,692,920 | Baker | Nov. 27, 1928 |
| 1,755,427 | Cochran | Apr. 22, 1930 |
| 1,979,989 | Neuman | Nov. 6, 1934 |
| 2,081,666 | Gunn | May 25, 1937 |
| 2,111,015 | Walker | Mar. 15, 1938 |
| 2,324,568 | Duggan | July 20, 1943 |
| 2,548,070 | Ryan | Apr. 10, 1951 |